(No Model.) 2 Sheets—Sheet 1.

J. DONOVAN.
RAILWAY VELOCIPEDE.

No. 575,465. Patented Jan. 19, 1897.

Witnesses

Inventor
James Donovan (No Model.) 2 Sheets—Sheet 2.
J. DONOVAN.
RAILWAY VELOCIPEDE.
No. 575,465. Patented Jan. 19, 1897.
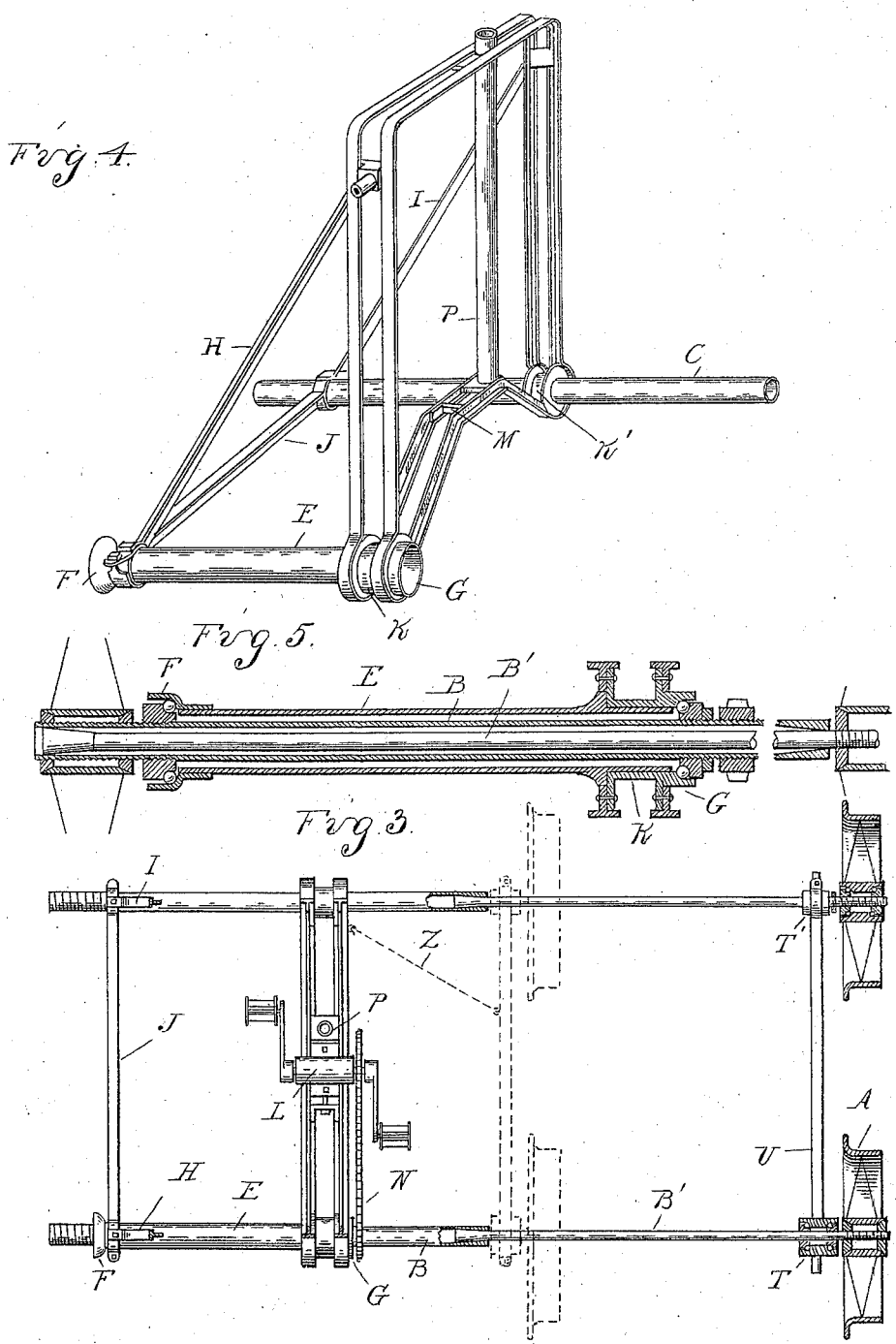
Witnesses
Otto H. Barthel
M. W. Dogherty
Inventor
James Donovan
By Barthel & Barthel
Att'ys.

UNITED STATES PATENT OFFICE.

JAMES DONOVAN, OF THREE RIVERS, MICHIGAN, ASSIGNOR TO THE ROBERTS, THROP & COMPANY, OF SAME PLACE.

RAILWAY-VELOCIPEDE.

SPECIFICATION forming part of Letters Patent No. 575,465, dated January 19, 1897.

Application filed September 24, 1896. Serial No. 606,832. (No model.)

*To all whom it may concern:*

Be it known that I, JAMES DONOVAN, a citizen of the United States, residing at Three Rivers, in the county of St. Joseph and State of Michigan, have invented certain new and useful Improvements in Railway-Velocipedes, of which the following is a specification, reference being had therein to the accompanying drawings.

This invention relates to a four-wheeled foot-propelled device; and the object is to produce a light-running speedy machine easily handled and propelled by one person, and yet capable of sustaining additional weight, and which can be easily changed to a narrower gage, so that it will pass through doorways if required to be loaded in a baggage-car or put away in a storage-room.

To this end my invention provides telescopic front and rear axles combined with a seat-supporting frame, so that the frame forms a strong truss when the wheels are extended to support the weight upon the wheels and relieve the axles of all bending strains, while at the same time the machine is collapsible in a simple and easy manner for the purpose described.

Figure 1:
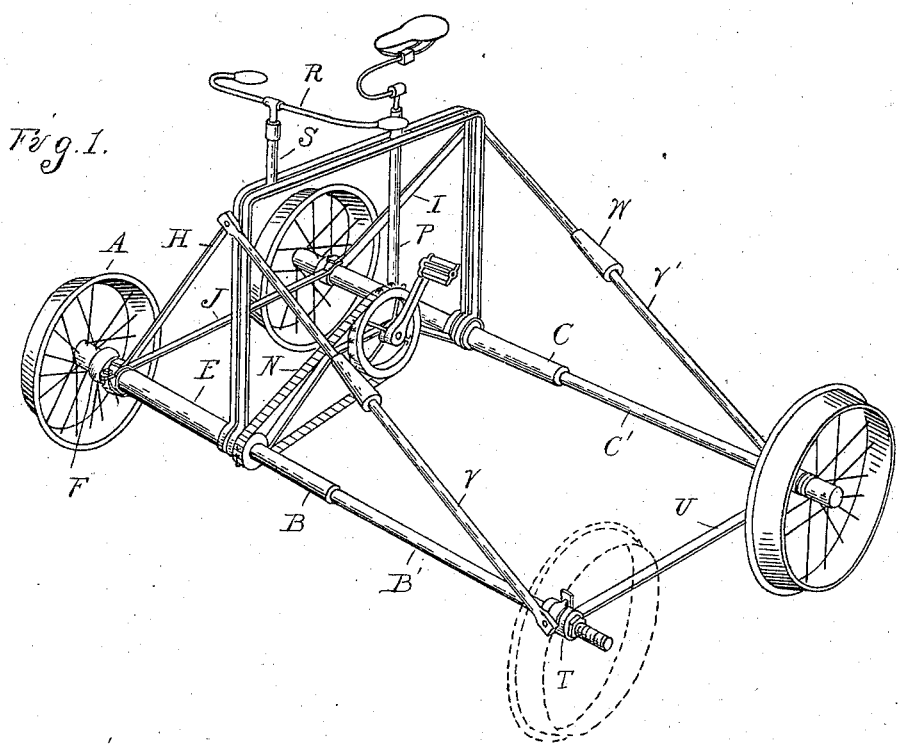
Figure 2:
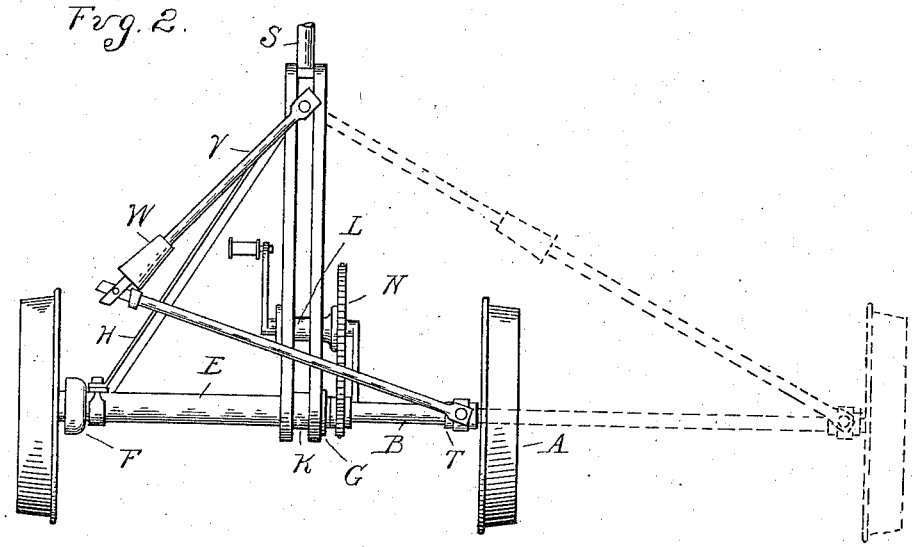

In the drawings, Figure 1 is a perspective view of my improved railway-velocipede as adjusted for use to run on the track. Fig. 2 is a front elevation thereof in the collapsed condition of the axles and showing in dotted lines its condition as in running. Fig. 3 is a plan of the seat-supporting frame in the extended condition of the axles. Fig. 4 is a detached perspective view of the seat-supporting frame, and Fig. 5 is a longitudinal section of the front axle.

A are the four track-wheels, in which the frame is mounted, the wheels being preferably of the description known as "suspension-wheels," as used in the construction of light vehicles, and the flanges of the wheels are preferably encircled by a rubber band intended to make the running of the machine noiseless upon the track.

The front and rear axles of the machine are made of telescopic sections, B B' being the sections of the front axle and C C' the corresponding sections of the rear axle. The hollow tubular outer sections B and C of these axles are in fixed relation with the wheels at one end, and the telescopic sections B' C', which telescopically connect with the sections B and C, carry the wheels on the opposite sides, the arrangement being such that the sections B' C' will completely telescope into the sections B and C, and thereby afford a sufficiently narrow gage to pass the machine through ordinary doorways, while if fully extended the machine is adapted to run on the ordinary track. The front axle is the driving-axle, and the wheels carried thereby are fast thereon, but the rear axle is fast with the frame, and the wheels turn loosely thereon on ball-bearings carried in the hubs of the wheels.

The seat-frame is in fixed relation with the outer tubular portion of the axles, but rests upon the part B of the front axle by means of a sleeve E, which is supported upon the tubular section B by means of end bearings F and G, which are preferably of the ball-bearing kind.

The end bearing F is contiguous to the hub of the wheel on one side, and the end bearing G is sufficiently removed from the end of the tubular section B to permit a portion of the section B to project. The cones of the bearings F and G prevent end motion of the sleeve E, while at the same time the front axle is free to revolve within the sleeve.

The sleeve E forms a member of the seat-supporting frame, which comprises, further, a yoked skeleton reach uniting the rear axle with the sleeve E and of the braces H and I and connecting-bar J.

The yoked skeleton reach is formed of two small continuous bars bent, as shown, and secured upon the sleeve E and axle C by means of two flanged collars K K', to the flanges of which the stem of the T-bars, which pass in contact with said flanges, are secured by suitable rivets or bolts. The collars K and K' are firmly secured, respectively, upon the sleeve E and rear axle C, the former being preferably combined with the ball-race of the bearing G.

Upon the lower portion of the skeleton reach is secured a crank-axle L, journaled in a bearing-block M, bolted in between the T-bars, and this crank-axle has the usual foot-crank and pedal motion, as in bicycle construction, and transmits motion through a chain N from a large sprocket-wheel upon the crank-axle to a smaller sprocket upon the shaft B. In suitable relation to the crank is supported upon a post P, bolted in between the T-bars, a suitable saddle for the rider and in front thereof is fixedly supported the handle-bar R upon a fixed post S, also conveniently located in between the T-bars, an adjustment being provided for raising and lowering the handle-bar in the well-known manner as applied to bicycles, the handle-bar having no further function than to steady the rider upon his seat.

The braces H and I connect the outer end of the sleeve E and axle C with the upper portion of the yoked skeleton reach, and their object, in connection with the bar J, is merely to give great rigidity to the seat-frame.

The extension member B' at the outer end is provided with a loose collar T, and the extension member C' is correspondingly provided with a fixed collar T', and the two collars are rigidly connected by a tie-rod U with each other, and by means of pivoted folding braces V V' they are connected with the seat-frame in such manner that when the wheels are extended the braces V and V' are fully extended. The joint in the folding braces is formed in such a manner that the overlapping ends thereof when the braces are fully extended form complementary parts of a truncated cone, and a conical sleeve W is carried upon each brace, which sleeve is adapted to slip over the cone and thereby form a locking device for the joint when the brace is extended.

In practice, the parts being constructed and arranged as shown and described, it will be seen that when the parts are in the position as shown in Fig. 1 the seat-frame, with the axles and braces, forms a skeleton truss, which supports the whole weight of the frame and rider directly upon the four wheels, and the axles B B' and C C' form the tie-rods of the truss, which is of the nature of a so-called "king-truss," of which the reach forms the king-post.

It will further be seen that the braces H V with the reach form a truss for the front axle, and the braces I V' with the reach form a truss for the rear axle, and thus the frame may be made very light and still have great rigidity and strength.

It will further be noticed that the seat-frame, that is, that part of it formed of the T-bars, is not in the longitudinal center when the axles are extended, and this distributes the center of gravity in such a manner that when the axles are extended, as in Fig. 1, the operator in stepping into the open space between the parts B' and C' of the axles and bending down to grasp the inner ends of the parts B and C the machine, when he lifts it up, balances in his hands, and he can thus lift it up off the track with all four wheels at once, and thus remove it very speedily from the track, and quickly bring it back again as opportunity offers. This is of great importance in handling the class of devices where prompt action is required to escape danger from approaching trains. Furthermore, it will be seen that by merely pushing up the sleeves W the braces V V' can be readily folded and simultaneously the parts B' C' be telescoped into the fixed portions of the axles, in which positions they may be retained by the use of a hooked brace Z.

What I claim as my invention is—

1. In a four-wheeled railway-velocipede, the combination of front and rear axles composed of telescoping sections and a seat-supporting frame with which said axles when extended form the tie-rods of a collapsible truss supporting the frame directly upon the wheels.

2. In a four-wheeled railway-velocipede, the combination of a front and a rear axle, each carrying a wheel at one end and provided with an extension member, carrying the wheel at the other end, a seat-supporting frame connected by collapsible braces with the ends of the extension members of the axles, said seat-supporting frame, braces and axles forming complementary parts of axle-trusses of which said axles are the tie-rods when said axles are in their extended conditions.

3. In a four-wheeled railway-velocipede, the combination of front and rear axles, each provided at one end with an extension member carrying one of the wheels, a seat-supporting frame in fixed relation with said front and rear axle and collapsible braces connecting said frame with the extension members of the axles and constituting complementary members of axle-trusses in the extended condition of the axles.

4. In a four-wheeled railway-velocipede, the combination of front and rear axles composed of tubular sections in fixed relation with the wheels on one side and of telescopic sections carrying the wheels on the other side, a seat-supporting frame in fixed relation with the tubular sections and collapsible braces connecting the seat-frame with the telescoping section of the axles, said seat-supporting frame, braces and axles forming complementary members of a collapsible truss-frame.

5. In a four-wheeled railway-velocipede, the combination of telescopic front and rear axles carrying the wheels on opposite sides in adjustable relation to each other, and a seat-supporting frame having collapsible connections with the telescopic members of the axles, said frame and connections being complementary members of axle-trusses in the extended condition of said axles.

6. In a four-wheeled railway-velocipede, the combination of front and rear axles, each composed of a fixed tubular and a telescopic adjustable section, carrying the wheels on opposite sides in fixed relation with their outer ends, a sleeve secured in end bearings upon the fixed section of the front axles, a seat-supporting frame in rigid connection with said sleeve and with the fixed section of the rear axle and provided with braces uniting it with the outer ends thereof, folding braces uniting the seat-frame with the outer ends of the telescopic sections of the axles and connecting-bars uniting the corresponding ends of the rear axle, said seat-supporting frame with said sleeve and braces forming in connection with the axles a collapsible truss.

7. In a four-wheeled railway-velocipede, the combination of front and rear axles, composed of fixed tubular sections, and telescopic adjustable sections carrying respectively the wheels on opposite sides, a sleeve secured by end bearings upon the fixed portion of the front axles, the yoked reach rigidly uniting the sleeve with the rear axles, the foot propelling mechanism mounted thereon and folding braces connecting said reach with the ends of the adjustable members of the axles.

8. In a four-wheeled railway-velocipede, the combination of the front axles composed of telescopic sections B B' and C C' the sleeve E mounted upon the front axle, the yoked reach formed of two bent T-bars uniting the sleeve with the rear axles by means of flanged collars around which said bars are bent and secured thereto, the foot propelling mechanism and seat mounted upon said frame, fixed braces connecting said reach with the ends of the axle-sections B and C and folding braces connecting it with the axle-sections B' C' and provided with locking-sleeves.

In testimony whereof I affix my signature in presence of two witnesses.

JAMES DONOVAN.

Witnesses:
GEO. A. ROBERTS,
JAMES E. BUNN.